July 30, 1968  L. K. POMEROY  3,394,920
CABLE GUIDING APPARATUS AND PROCESSES FOR PROTECTING CONDUITS
Filed May 29, 1967  2 Sheets-Sheet 1

Lores K. Pomeroy
INVENTOR

BY Roger L. Martin

Attorney

July 30, 1968  L. K. POMEROY  3,394,920
CABLE GUIDING APPARATUS AND PROCESSES FOR PROTECTING CONDUITS
Filed May 29, 1967

Lores K. Pomeroy
INVENTOR

BY Roger L. Martin

Attorney

United States Patent Office 3,394,920
Patented July 30, 1968

3,394,920
CABLE GUIDING APPARATUS AND PROCESSES
FOR PROTECTING CONDUITS
Lores K. Pomeroy, Rte. 1, Box 127,
Tavares, Fla. 32778
Filed May 29, 1967, Ser. No. 642,071
11 Claims. (Cl. 254—134.3)

ABSTRACT OF THE DISCLOSURE

The disclosure relates to an apparatus which may be used in guiding a moving cable around a bend in a conduit or pipe and to methods which may be used in protecting the wall of the bend from the abrasive action of the cable. The apparatus is especially useful for guiding cables around conduit bends when the cable is being withdrawn from the conduit under heavy drag conditions such as are encountered during the installation of high voltage electrical transmission cables in underground conduits at power generation and transmission facilities etc.

The apparatus has an assembly which can be flexed and which includes a roller, sprocket chain type, length which is inserted in the conduit and into a position at the bend where it is capable of adapting to the contour of the pipe wall at the inside of the bend. Means are provided for manipulating the assembly into its proper position at the bend and which permits the manipulation to be performed by hand at a position remote from the bend as for example through an opening in the conduit which is above the bend. As an aid in guiding the chain type linkage mechanism of the assembly into a proper position at the pipe bend, provisions are made in the assembly for loosely attaching the assembly to the cable so that under slackened conditions, the rollers of the assembly will remain properly oriented with respect to the cable as the assembly is passed into the conduit and manipulated into place.

The conduits housing the electrical transmission cables must be kept free of dirt and mechanical parts as the transmission cables are being installed, and hence provisions for covering the open end of the conduit are made and which permit the passage of the winch cable through the conduit opening.

Background of the invention

The invention relates to an apparatus for use in guiding cables around conduit bends and to methods for protecting the conduits used in housing electrical cables from damage caused by the use of a winch cable in pulling the electrical cable into the conduit housing.

At high voltage electrical power facilities, such as electrical generating plants, sub-stations and other electrical transmission facilities, the primary electrical conduits or cables are frequently housed in underground conduits or pipes and through which fluid is circulated to dissipate heat. Those skilled in the art are aware that any appreciable damage to either the transmission cable or to the conduit housing such a cable can not be tolerated in the final installation.

The current practice in constructing such facilities is to first install the underground conduits and thereafter to pull the transmission cables into the conduits through one of the open ends. To accomplish the latter, a winch cable is first passed through the conduit with the aid of a small line previously passed into the conduit by compressed air means known in the art, and after the winch cable is attached to the transmission cable, the former is withdrawn from the conduit to pull or drag the transmission cable into its proper place in the conduit.

In most of the installations, the underground conduits have upright sections at the opposite ends and these are connected to the main horizontal below ground sections of the conduit by a bend, such as a ninety degree bend section. Hence, in pulling the transmission cable into place with the aid of an above ground winch, the winch cable must extend down through the upright section at the winch end of the conduit and thence via the bend into the horizontal section and ultimately to its connection with the transmission cable. Without the aid of something to protect the elbow or bend at the winch end of the conduit from the abrasive action of the winch cable, as the latter is being withdrawn from the conduit by the winch, experience has shown that the conduit wall is on occasions so damaged at the bend that thereafter as the transmission cable is pulled around the bend, it also is damaged by the grooves and cuts made in the wall of the bend by the winch cable. The transmission cables used at such installations are sheathed to withstand minor abrasions during the process of installing the cables in the conduits but this is frequently inadequate to withstand the encounters with the cut surfaces at the bends, and consequently major and costly repairs must be made to the transmission cable and to the conduit section before the installation is ready for use when such damage results.

For background purposes it may be also stated that rigid controls are placed upon the contractors installing such facilities so as to maintain the conduits free of all foreign matters such as bolts, nuts, dirt, etc., this of course to be assured that such items do not find their way into the fluid pumping and heat transfer apparatuses which are subsequently connected to the conduit. This means that any device or apparatus which is used for guiding the cable around the bend must be free as a practical matter from damage and breakage that would otherwise leave parts in the conduit after the apparatuses have served their intended purpose.

Summary of the invention

The invention has to do with apparatuses that can be used in guiding cables around bends in conduits and to methods relating to the use of such apparatuses in the installation of electrical transmission cables in underground conduits.

A general object of the invention is to provide an apparatus for use in guiding winch cables around bends in conduits and to methods for protecting such conduits from damage by such cables.

One particular object is to provide an assembly that can function as a guide for a winch cable and a means for protecting an underground conduit bend from damage by a winch cable during the installation of electrical transmission cables in underground conduits and which can be inserted in an opening at the winch end of the underground conduit and manipulated into a cable guiding and wall protecting position from the opening.

Another object is to provide a simple, rugged, relatively inexpensive apparatus which can be effectively used as a winch cable guide for bends of different curvatures in underground conduits and which can be manipulated into place from an opening in the conduit above the bend.

Another object is to provide a winch cable guide for use in installing electrical cable in pipes and conduits and the like and which can serve at a bend in the pipe to protect the pipe wall from damage by the winch cable and to also provide methods for using such guides in the installation of such electrical conduits.

The apparatus in accord with the one aspect of the invention has an elongated roller containing assembly which can be inserted in the conduit and which is adapted to flex or bend to the general curvature along the pipe at the inside of the bend. This enables the assembly to generally adapt itself to the contour of the conduit wall along and at the inside of the bend and whereat the cable can traverse the bend apart from contact with the conduit wall by passing along the rollers. The assembly is forcefully held in place during use of the apparatus by the pressure exerted against the assembly by the cable during the process of being withdrawn from the conduit, and is shown hereinafter in a form similar to a single strand length of sprocket type roller chain and wherein the surfaces of the rollers are appropriately recessed to receive the cable.

The assembly is especially useful in guiding winch cables around bends in underground conduits and wherein there is an above ground opening in the conduit above the bend and through which the assembly can be inserted and subsequently manipulated into its proper position at the bend. Hence in accord with another aspect of the invention provisions are made for loosely attaching the assembly to the cable in a manner such that the assembly can be caused to slide along a length of the cable as it passes through the conduit to its proper position at the bend. The means provided serves to maintain proper orientation of the rollers and the cable as the assembly is passed into the conduit and subsequently manipulated into its proper place at the bend for the wall protecting purpose served thereat. In accord with yet another aspect of the invention, the apparatus is provided with means attached to the assembly and which enables the assembly to be manipulated into the conduit from the exterior thereof.

In use, the assembly is attached to the winch cable after the latter has been passed through the conduit, and once attached, the assembly is passed into the conduit and manipulated from the opening into a proper position at the bend while the cable is in a slackened condition. Thereafter as the cable is tightened the assembly is caused to generally conform to the contour of the pipe at the inside of the bend and serves to guide the cable around the bend as the cable is withdrawn from the conduit.

Brief description of the drawings

A preferred embodiment of the invention is shown in the drawings and wherein.

Description of prepared embodiment

Figures 1, 2:
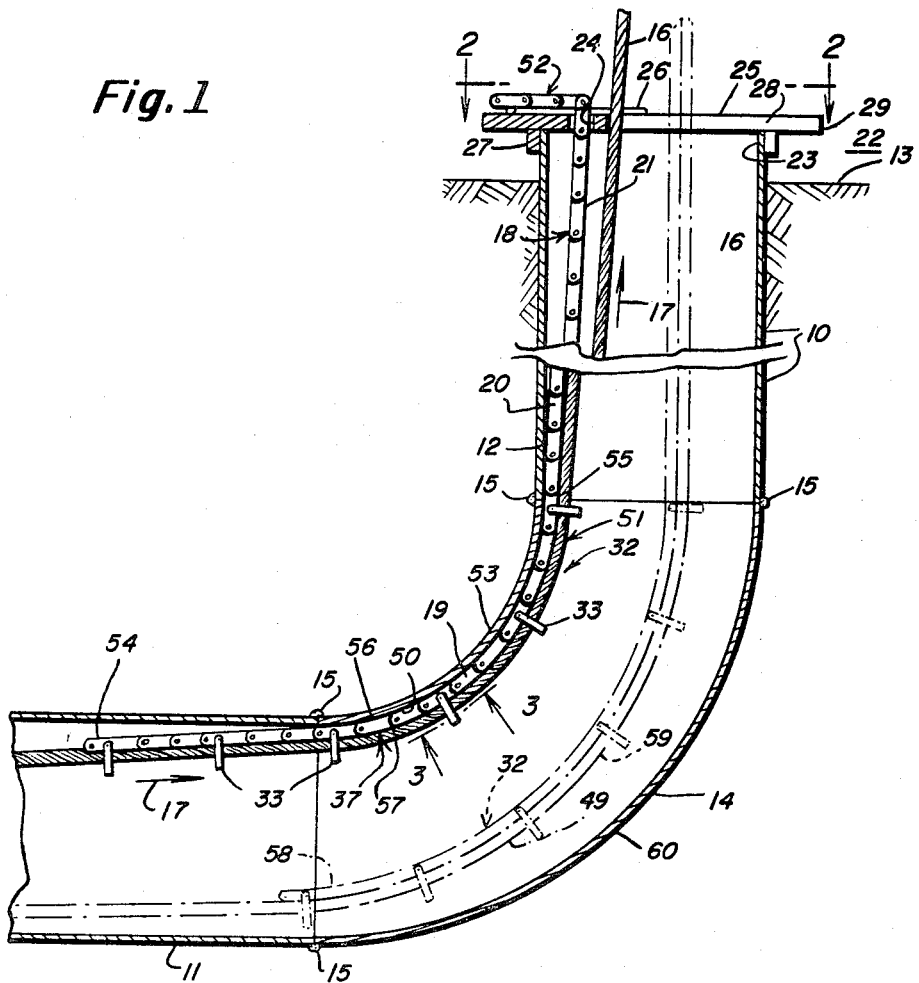
FIG. 1 depicts in section the winch end of an underground conduit which is to serve as a housing for an electrical transmission cable and shows an apparatus embodying the concepts of the invention in working relation with a winch cable as the cable is being withdrawn from and is traversing a bend in the conduit, a slackened position for the cable and its relation to the apparatus as the latter is being manipulated into place for use in guiding the cable being shown in broken lines to illustrate certain process aspects of the invention.
FIG. 2 is a top or plan view of a cap or cover plate at the opening in the conduit, as the plate is seen along the lines 2—2 of FIG. 1, and shows a simple means for suspending the apparatus at the opening of the conduit when the cable is being withdrawn therefrom.

Reference is first made to FIG. 1 wherein an underground conduit which is to be used in housing an electrical transmission cable is shown at 10. Also shown is a winch cable 16 and an apparatus 18 which embodies the concepts of the invention, the cable 16 and the apparatus 18 being depicted in solid lines in the positions they assume as the cable 16 is being withdrawn from the conduit 10 through the open end thereof, as in the direction of arrows 17. FIG. 1 illustrates the winch end of the conduit and it should be understood that the winch cable has previously been passed through the conduit and suitably attached to one or more electrical transmission cables at the other end of the conduit and which are in the process of being pulled into their proper positions or places in the conduit by and as the winch cable is being withdrawn from the conduit.

The conduit 10 includes a horizontal below ground section 11 that is connected to an upright section 12 at the winch end of the conduits shown in FIG. 1 by means of a ninety degree bend section 14. The sections are illustrated as joined by welds 15. Above the ground level 13, the conduit 10 communicates with the exterior through the opening 23 at the upper end of the upright 12 and which it will be noted is covered by a cap or cover plate 25 to be subsequently described and which is used to keep foreign matter such as dirt, bolts etc. from entering the conduit during the process of installing the transmission cable in the conduit.

The winch for drawing the transmission cable through conduit 10 is not shown but will be understood as being above ground in the illustration. The winch cable is shown in the wire rope form commonly employed for such usages and as depicted in FIG. 1 is being drawn in by the winch in the direction of arrow 17 as previously indicated.

The apparatus 18 which is used for guiding the cable 16 around the bend 14 is shown in the form of a modified elongated single strand roller carrying sprocket type chain 20. The lower end length 19 of chain 20 has a plurality of U-shaped elements 33 that are appropriately spaced along the length and releasably connected to the chain links. This length 19 and the attached elements 33 constitute an assembly component 32 of the apparatus which can be inserted in the conduit and manipulated into a proper position for serving as a guide for the cable as it traverses the bend.

The upper end length 21 of chain 20 is of course connected at one end of the lower length in the manner that all links in the chain are connected and is used not only in inserting and withdrawing the assembly from the conduit but also in hand manipulating the assembly from the open end of the conduit into a proper position at the bend for usage as a cable guide. As shown in FIG. 1, the upper length 21 extends from the connection with the assembly 32 to the exterior of the conduit through the open end 23 of section 12 and here the rectangular cover plate 25 is provided with a suitable opening 24 enabling the upper end 52 of the length to pass to the exterior side of the closure for suspension by a rod 26 of the apparatus 18 during the cable withdrawal. The rod 26 passes between the adjacent rollers of the chain at the top of the plate and merely rests on the metal cover to prevent the chain from falling down into the conduit.

As will be seen in FIG. 2, the cover plate 25 has a square profile and is provided (FIG. 1) with a depending annular flange portion 27 that laps the outer edge of the conduit at opening 23. The flange 27 serves to retain the plate in place and whereat the plate serves to prevent entry of foreign matter into the conduit as the cable is being withdrawn. The cover plate is also provided with a slot or opening 28 that enables the winch cable 16 to pass through the plate as it is drawn in by the winch. Slot 28 extends to the edge 29 of the cover plate as shown in FIGS. 1 and 2 so as to enable its removal and placement over the end of the upright section 12 without obstruction by cable 16.

Both lengths 19 and 21 of chain 20 in the illustration are made up of roller carrying links 30 that are connected by link pins 31 which provide pivotal connections between the adjacent links in the chain. This type arrangement permits the lengths to flex or bend toward either of the open sides of the chain while nevertheless limiting such movement toward the link plate sides of the chain. The linkage and roller arrangements are the same in both lengths 19 and 21 and will be evident from a consideration of the assembly 32 of parts that make up the cable guiding conduit wall protecting portion of the apparatus and which unlike the upper end length 21 is also provided with the U-shaped elements that serve as a means for attaching the assembly to the cable while nevertheless permitting the assembly to be slid along the cable when the assembly is being inserted in the conduit and also permitting the cable to pass along the assembly when the assembly is performing its cable guiding function.

Assembly 32 includes an elongated linkage mechanism 37 having opposite ends 54 and 55 and is made up of a plurality of chain links 30 that are pivotally interconnected by link pins 31. The rollers 32 of the assembly are spaced apart along the length of the mechanism 37 as seen in the drawings and are rotatably mounted on the mechanism 37 with their rotational axes extending transversely of the mechanism and in parallel, and also in a coaxial arrangement with the respective axes of the pins. It will be evident that the linkage arrangement in the assembly permits mechanism 37 to be flexed or bent toward either of the open opposite sides 56 and 57 of the mechanism 37. This arrangement enables the mechanism 37 to bend into engagement with the conduit wall at the inside 53 of the bend 14 and to thereat generally assume the curvature along the conduit wall at this side of the pipe bend.

Figure 3:
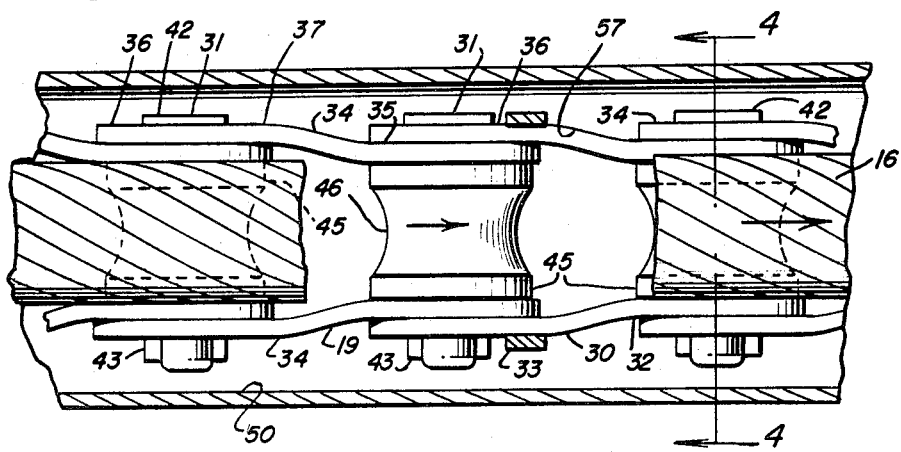
FIG. 3 is an enlarged view looking toward the conduit wall at the inside of the bend showing a portion of the assembly and cable as seen generally along the lines 3—3 of FIG. 1, certain parts of the cable and a shackle element used in loosely fastening the assembly to the cable being broken away to expose the parts of the linkage mechanism of the assembly.
Figure 4:
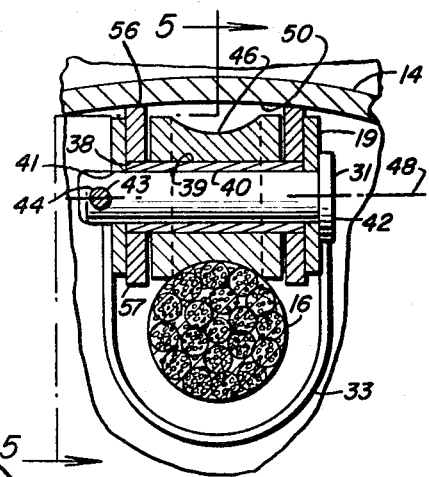
FIG. 4 is a section view at the connection between adjacent links in the linkage mechanism of the assembly and shows how the rollers are mounted on the mechanism, the view being taken generally along the lines 4—4 of FIG. 3.

In FIGS. 3 and 4 it will be seen that the links 30 of chain 20 are of the offset type in the illustrated embodiment, although other arrangements may be used with equal facility. The plates 34 of the links are thus bent and inset at the roller ends 35 of each link whereas at the opposite ends 36 of the links the link plates are adapted to straddle the roller ends of the adjacent links in the chain.

The roller ends of the link plates 34 have aligned bores 38 and the spaced plates of each length are interconnected by hollow bushings 39 which extends transversely of the length and which are pressed fit at their opposite ends into the adjacent bores 38 so as to rigidly interconnect the plates of each link.

Aligned bores 41 are also provided at the other ends 30 of the link plates 34 and the connecting pin 31 extends through these bores in the hollow 40 of the bushing 39. The pin head 42 engages the side of one of the plates of the link and is held in place at the opposite side of the link by a transverse retainer pin 43 that is pressed fit in a suitable bore 44 at the end of the pin shank. The retainer pin 43 here as shown in FIGS. 3 and 5 laps the side of the link plate and restrains the link pin against axial movement.

Figure 5:
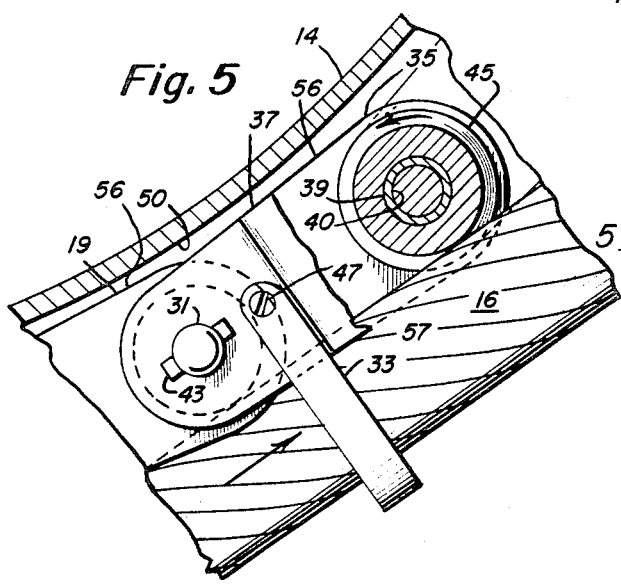
FIG. 5 is a plate side view of a portion of the assembly shown in FIG. 3 as the portion is generally seen along the lines 5—5 of FIG. 4 with certain parts being broken away and others shown in section.

The rollers 45 as seen in FIGS. 3 and 5 are mounted in the space between the link plates for rotation on the bushings 39 and are provided with recessed or grooved surfaces 46 which are inset from the open opposite sides 56 and 57 of mechanism 37. This arrangement permits the roller 45 to freely rotate under the influence of the moving cable when the assembly is in use and to do this without encountering the wall of the conduit.

The shackles 33 of assembly 32 are elongated rectangular metal strips that are bent to a U-shape as seen in FIG. 4. In the assembly shown, shackles 33 are spaced apart along and between the opposite end 54 and 55 thereof the linkage mechanism 37 and are fastened to the link plates of every third link along the length of the assembly by means of screw elements 47 which are threaded in the side plates of the link. These shackle elements loosely embrace the cable when the assembly is attached to the cable as seen in FIG. 4 and provide a means for loosely connecting the assembly to the cable that also serves to retain the cable and the roller surfaces in working alignment along the cable side 57 of the linkage mechanism 37.

The pins 31 snugly fit in the bushings and the roller ends of the links snugly fit between the link plates of the adjacent lengths in the mechanism so that practically no twisting of the elongated assembly 32 occurs.

The device 18 is placed in use after the winch cable 16 has been drawn through the conduit 10 and has been attached to a transmission cable at the other end of the conduit. The cover plate 25 is of course removed from the upright 12 when the cable is initially passed into the conduit 10. Once the winch cable 16 has been attached to the transmission cable at the other end of the conduit, cable 16 is permitted to assume a slackened condition, such as shown by the broken line position 49 for the cable in FIG. 1. The assembly 32 is then attached to the cable 16 at the open end of the upright section. This is accomplished by removing one of the shackle attaching machine screws from each of the shackles 33 and again attaching the shackles 33 to the link plates 34 with a length of the winch cable embraced by the shackles.

Once the device is attached to the length of cable 16, the worker grasps the top length 21 of the chain, and lets the flexible assembly 32 slide down the cable 16 through opening 23 and thus into the conduit. As this happens the shackle elements serve as guides for the movement of the assembly along the slackened cable and retain the cable and rollers in working alignment along side 57 of the mechanism 37. Through manipulation of the chain length 21 at the opening 23, the assembly is next manipulated by the worker into a position, such as shown at 58 in FIG. 1, and whereat the assembly 32 is disposed between the length 59 of cable 16 at the bend 19 and the conduit wall 50 at the inside 53 of the bend. Because of the close fit between parts of the chain, the amount of twisting that occurs is minimal and manipulation of the assembly 32 into position 58 is relatively easy. Once the assembly 32 is in place, the cable 16 is tightened by operation of the winch to take up the slack in the cable. As this happens the cable 16 carries the assembly 32 into engagement and forceful contact with the conduit wall 50 at the inside 53 of the bend of the section and thus into the working position 51 shown in FIG. 1. In being carried from position 58 into position 51 by the cable 16, the assembly 32 is caused to bend or flex toward the wall contacting side 56 of the mechanism upon encountering the conduit wall at the inside 53 of the bend and as this happens the assembly assumes the general contour of the wall at the inside 53 of the bend.

Once the assembly 32 is in its working position 51 as shown in FIG. 1, the upper end 52 of the chain 20 is passed through the opening 24 in the cover plate 25 and the plate 22 is placed on the end of the upright section 12 with the cable appropriately positioned in slot 28. The rod 26 is then slipped in between adjacent rollers 45 at the exterior of plate 25 so as to appropriately suspend the chain in place. Once this is done, the cable 16 is drawn in by the winch to pull the transmission cable through the conduit. As this happens the cable 16 is supported spacedly apart from the conduit wall 50 through contact with the rollers 45 of assembly 32 as it traverses the conduit bend, and hence the wall 50 is protected from the abrasive action that would otherwise occur through contact with the cable in the absence of the cable guiding assembly.

Once the end of the transmission cable reaches the bend 14 in the installation process, the winch cable 16 may be slackened, the cover plate 25 removed, and the assembly 32 removed from the conduit through the open end 23 by merely pulling the chain lengths up through this opening. The assembly is then detached from cable 36. Thereafter, the winch cable is further withdrawn from the conduit to pull the transmission cable around the bend and into the upright section. Because of the absence of cuts and grooves in the wall of the bend practically no damage to the electrical cable occurs as it traverses the bend.

Other means for use in manipulating the assembly into place from the opening in the conduit will readily occur to those skilled in the art and other means for retaining the slackened cable that the roller contacting side of the assembly and which aids in guiding the roller carrying linkage mechanism into its proper place in the conduit will also occur to those skilled in the art. Hence while only the preferred embodiment of this invention has been shown and described by way of illustration, many modifications will occur to those skilled in the art and it is, therefore, desired that it be understood that it is intended in the appended claims to cover all such modifications that fall within the true spirit and scope of this invention.

What is claimed as new and what is desired to secure by Letters Patent of the United States is:

1. An apparatus for use in guiding a winch cable around a bend in a conduit comprising an assembly which is adapted to pass into the conduit and which includes an elongated linkage mechanism having opposite sides, and a plurality of rollers which are rotatably mounted on the mechanism; said mechanism comprising pivotally interconnected links enabling the mechanism to be flexed toward one of said opposite sides and generally to the contour of the conduit wall along and at the inside of the bend, said rollers being arranged one adjacent the next along the length of said mechanism with their axes in parallel and extending transversely of the mechanism, and said rollers having surfaces which are offset inwardly at said one of said opposite sides and arranged for rolling contact with the cable at the other of said opposite sides, said linkage mechanism being adapted for engagement with the conduit wall at said one of said opposite sides.

2. An apparatus for use in guiding a winch cable around a bend in a conduit in accord with claim 1 wherein said assembly further includes means for loosely connecting the assembly to the cable and which means is adapted to serve as a guide for retaining the cable and rollers of the connected assembly in general alignment when the connected assembly is caused to move along a slackened length of the cable.

3. An apparatus for use in guiding a winch cable around a bend in a conduit in accord with claim 1 and further comprising hand manipulatable means attached to said assembly for use in orienting the assembly in the conduit from a position exteriorly thereof.

4. An apparatus for use in guiding a winch cable around a bend in a conduit in accord with claim 1 further comprising means attached to the assembly and hand manipulatable from a position exteriorly of the conduit for use in orienting the assembly in the conduit with respect to the conduit wall at the inside of the bend, and wherein said assembly further includes elements spaced apart along the length of said mechanism for loosely connecting the assembly to the cable, said elements being adapted to embrace the cable and retain the cable and rollers of the connected assembly in general working alignment at the other of said opposite sides.

5. In combination with an underground conduit having an above ground opening at one end thereof and a below ground bend below said opening, and a winch cable extending around the bend in the conduit and outwardly through said opening for use in pulling an electrical cable into said conduit at the opposite end of the conduit, the improvement comprising an assembly disposed in the conduit at said bend for guiding the winch cable around said bend and which includes an elongated linkage mechanism having opposite ends and opposite sides, and a plurality of rollers that are rotatably mounted on the mechanism; said mechanism having pivotally interconnected links enabling the mechanism to be flexed toward either of said opposite sides and being held by the winch cable in forceful contact with and against the conduit wall with one of said opposite sides in contact with the wall along and at the inside of the bend; said rollers being arranged one adjacent the next along the length of said mechanism with their axes in parallel and extending transversely of the mechanism, and said rollers having surfaces which are offset inwardly at said one of said opposite sides and arranged in rolling contact with the winch cable along the other of said opposite sides.

6. In combination with an underground conduit having an above ground opening at one end thereof and a below ground bend below said opening, and a winch cable extending around the bend in the conduit and outwardly through said opening for use in pulling an electrical cable into said conduit at the opposite end of the conduit, the improvement in accord with claim 5 further comprising covering means covering the opening at said one end and having an opening therein, and an elongated hand manipulatable means connected to the assembly and extending to the exterior of the conduit through the opening in said covering means for use in hand manipulating the assembly in the conduit from the conduit opening above said bend and for withdrawing the assembly from the conduit; said assembly further including means connected to the elongated linkage means and loosely embracing said winch cable at said bend for use in guiding the assembly along the winch cable when the assembly is inserted in the conduit.

7. In combination with an underground conduit having an above ground opening at one end thereof and a below ground bend below said opening, and a winch cable extending around the bend in the conduit and outwardly thereof through said opening for use in pulling an electrical cable into said conduit at the opposite end of the conduit, the improvement comprising covering means covering said opening having a first opening through which the winch cable extends and a second opening, and an apparatus for use in guiding the winch cable around said bend; said apparatus including an elongated means generally disposed in the conduit and having an end portion extending through said second opening, and means engaging said end portion exteriorly of the conduit at said second opening and suspending the elongated means therebelow; said elongated means having an elongated assembly below said end portion and which is disposed in the conduit at said bend for guiding the winch cable around said bend, said assembly comprising an elongated linkage mechanism having opposite ends and opposite sides which are spaced apart between the opposite ends thereof, and a plurality of rollers that are rotatably mounted on the mechanism; said mechanism having pivotally interconnected links enabling the mechanism to be flexed toward either of the opposite sides thereof and being held by the winch cable in forceful contact with and against the conduit wall with one of said opposite sides in contact with the wall along and at the inside of the bend, said rollers being arranged one adjacent the next along the length of said mechanism with their axes in parallel and extending transversely of the mechanism, said rollers having recessed surfaces adapted to receive the winch cable and which are offset inwardly at one of said opposite sides and arranged in rolling contact with the winch cable along the other of said opposite sides, said links including pairs of spaced and rigidly interconnected link plates, and each of said rollers being mounted on said mechanism in the space between the plates of a respective one of said pairs.

8. In a process of installing electrical cable in a conduit having an above ground opening at one end thereof and a below ground bend below the opening, and wherein a winch cable, previously passed in the conduit and connected to the electrical cable at the other end of the conduit is withdrawn from the conduit through the opening at said one end to thereby pull the electrical cable into the conduit, the method of protecting the wall of the conduit from the abrasive action of the winch cable as it traverses the bend comprising: passing into the conduit through said opening an assembly which includes an elongated mechanism having opposite ends and opposite sides which extend between said ends and which further includes rollers which are spaced apart and arranged one adjacent the next along the length of the mechanism for contact with the cable along one of said opposite sides; while the winch cable is in a slackened condition manipulating the assembly into a position which is generally between the length of the cable along the bend and the conduit wall at the inside of the bend and in which position the cable length along the bend faces the rollers at said one of said opposite sides; tightening said winch cable to take up the slack therein and to carry said assembly into forceful contact with the wall of the conduit at the inside of said bend and with the other side of said opposite sides in contact with said wall; and thereafter withdrawing the winch cable from the conduit.

9. In a process of installing electrical cable in a conduit having an above ground opening at one end thereof and a below ground bend below the opening, and wherein a winch cable, previously passed into the conduit and connected to the electrical cable at the other end of the conduit is withdrawn from the conduit through the opening at said one end to thereby pull the electrical cable into the conduit, the method of protecting the wall of the conduit from the abrasive action of the winch cable as it traverses the bend in accord with claim 8 further comprising: before passing the assembly into the conduit attaching the assembly to the winch cable at said one of said opposite sides by means permitting relative movement of the assembly along the winch cable.

10. In a process of installing electrical cable in a conduit having an above ground opening at one end thereof and a below ground bend below the opening, and wherein a winch cable, previously passed into the conduit and connected to the electrical cable at the other end of the conduit is withdrawn from the conduit through the opening at said one end to thereby pull the electrical cable into the conduit, the method of protecting the wall of the conduit from the abrasive action of the winch cable as it traverses the bend in accord with claim 8 further comprising: before passing the assembly into the conduit attaching the assembly to the winch cable at said one of said opposite sides by means permitting the relative movement along the winch cable; and manipulating the assembly into said position by means attached to said assembly and manipulatable at the opening in said conduit.

11. In a process of installing electrical cable in a conduit having an above ground opening at one end thereof and a below ground bend below the opening, and wherein a winch cable, previously passed into the conduit and connected to the electrical cable at the other end of the conduit is withdrawn from the conduit through the opening at said one end to thereby pull the electrical cable into the conduit, the method of protecting the wall of the conduit from the abrasive action of the winch cable as it traverses the bend comprising: attaching to the winch cable an elongated flexible assembly having an elongated mechanism and rollers which are spaced apart one adjacent the next along the length of the mechanism and which are arranged for rolling contact with the winch cable at one side of the mechanism, said attaching being by means retaining the winch cable at said one side and permitting the winch cable to be drawn there along and in contact with said rollers; passing the assembly into the conduit through said opening by sliding the assembly along the winch cable; while the winch cable is in a slackened condition manipulating the assembly into a position which is generally between the length of the cable along the bend and the conduit wall at the inside of the bend by means connected to the assembly and hand manipulatable at the above ground opening in the conduit; while maintaining said assembly in said position, tightening said winch cable to take up the slack therein and carry said assembly into forceful contact with the wall of the conduit at the inside of said bend, thereby causing said assembly to flex and generally assume the contour along the conduit wall at the inside of the bend; and thereafter withdrawing the winch cable from the conduit.

References Cited

UNITED STATES PATENTS 3,218,033 11/1965 Miller _____ 254—134.3
3,306,581 2/1967 Miller _____ 254—134.3

OTHELL M. SIMPSON, *Primary Examiner.*